CODED TONE SUPERVISORY SYSTEM

Filed Sept. 11, 1964 8 Sheets-Sheet 1

INVENTOR.
NORMAN F. AGNEW
BY
CAROTHERS AND CAROTHERS
HIS ATTORNEYS

CODED TONE SUPERVISORY SYSTEM

Filed Sept. 11, 1964

8 Sheets-Sheet 2

INVENTOR.
NORMAN F. AGNEW
BY
CAROTHERS AND CAROTHERS
HIS ATTORNEYS

Aug. 6, 1968    N. F. AGNEW    3,396,370

CODED TONE SUPERVISORY SYSTEM

Filed Sept. 11, 1964    8 Sheets-Sheet 3

INVENTOR.
NORMAN F. AGNEW
BY
CAROTHERS AND CAROTHERS
HIS ATTORNEYS

CODED TONE SUPERVISORY SYSTEM

Filed Sept. 11, 1964 8 Sheets-Sheet 4

INVENTOR.
NORMAN F. AGNEW
BY
CAROTHERS AND CAROTHERS
HIS ATTORNEYS

INVENTOR.
NORMAN F. AGNEW
BY
CAROTHERS AND CAROTHERS
HIS ATTORNEYS

Aug. 6, 1968 N. F. AGNEW 3,396,370

CODED TONE SUPERVISORY SYSTEM

Filed Sept. 11, 1964 8 Sheets-Sheet 6

INVENTOR.
NORMAN F. AGNEW
BY
CAROTHERS AND CAROTHERS
HIS ATTORNEYS

Aug. 6, 1968 N. F. AGNEW 3,396,370

CODED TONE SUPERVISORY SYSTEM

Filed Sept. 11, 1964 8 Sheets-Sheet 7

INVENTOR.
NORMAN F. AGNEW
BY
CAROTHERS AND CAROTHERS
HIS ATTORNEYS

CODED TONE SUPERVISORY SYSTEM

Filed Sept. 11, 1964 8 Sheets-Sheet 8

INVENTOR
NORMAN F. AGNEW
BY
CAROTHERS AND CAROTHERS
HIS ATTORNEYS

United States Patent Office 3,396,370

Patented Aug. 6, 1968

3,396,370

CODED TONE SUPERVISORY SYSTEM

Norman F. Agnew, Irwin, Pa., assignor to Femco, Inc., Irwin, Pa., a corporation of Pennsylvania Filed Sept. 11, 1964, Ser. No. 395,689
7 Claims. (Cl. 340—163)

ABSTRACT OF THE DISCLOSURE

A coded tone supervisory system transmitted over a two wire control line between stations connected thereto, each station having tone transmitters and corresponding tone receivers the former actuating a specific combination of tone repeating relays energized by the signal including a first tone frequency pulse an interval period followed by a second tone frequency pulse followed by an open time period which completes the code for the selected function transmitted. The code signal includes a group selection and a function selection in combination with the first and second pulses transmitted. The tone receivers at the receiving station responding to their respective frequencies transmitted and require at least two tone receivers to determine the group selection and the function selection from the signal to energize the selected receiver relay which in turn selects one of a series of group relays selected by a repeater relay in response to the first tone frequency, and a function relay in response to the second tone frequency which operate through the selected group relays to energize the specific selected group relay and the specific selected function relay for the purpose of closing contacts to complete the function selected for transmission. Through this system of the combination of plurality of tone transmitters and receivers operating their respective receiving relays may with two different tones provide ten selections to energize one of a specific group of ten relays for the first tone burst and another providing ten selections for energizing one of a specific function relay for the second tone burst. This in turn multiplies the possible combination of transmitting one hundred functions. If three different function tones are used the selection of a total of three hundred functions may be transmitted.

This invention relates to coded tone supervisory systems for controlling the operation of functions at selected of a plurality of remote stations from one or more transmitting stations over a two wire control line.

Two wire control lines have been used in the past but such systems generally were subjected to false indications which cannot be tolerated in supervisory systems that control the movement of traffic such as railway, automobile and the like.

The present system avoids all disadvantages of previous two wire control line systems by providing the transmission and reception of spaced tone pulses; the first tone pulse sets up one or more of a group of relays and the second tone pulse sets up one or more of a series of function relays through the selected of those selected in the first group of relays which represents a novel advancement of this invention. This novel system carries the control forward by transmission of a third tone pulse simultaneously with at least part of the second tone pulse and as a function control tone that sets up a complete function through the selected of the first group of relays and the selected of the second or function relays to complete the function required which circuit in itself is a novel portion of this invention. After a selected final function has been made the circuit may deenergize itself owing to the completion of the function or the circuit may maintain its energized condition which may be returned to normal by setting up the same circuit after initially completing the function. The circuit may drop out for the lack of the selected third tone pulse when due. This is a novel feature of this invention and these all represent important objects of this invention.

Another object is the provision of a two wire control line system providing the transmission and reception of spaced tone pulses each of which is a burst of two tone frequencies. By transmitting two tone frequencies as a burst the two matched tone frequency receivers that respond thereto provide a safer system as probability of a false reception of two simultaneous tone frequencies is improbable. Each of these tones in one burst will energize a receiver relay. Thus two receiver relays are energized for each burst and their contacts are connected in circuits in conjunction with each other and with the contacts of the corresponding relays that are not energized to selectively complete a circuit to energize the proper group relay. The second burst of two tone frequencies selects the matched tone receivers to energize their corresponding receiver relays to select the coded function relay through the coded group relay. This circuit represents a principal object of this invention since a burst of two tones for each pulse sets up a positive control system not subject to false indications. Further the dual energization of the receiver relays provides a basic circuit that permits expansion of the functions that may be controlled. If there are five different tones the dual pulse provides ten selections and each of these ten selections may energize a specific group relay for the first burst and a specific funtcion relay for the second burst. This provides a combination of a hundred functions. When three different function tones are used for the selection of one hundred function relays a total of three hundred final stick relays may be selectively energized to complete three hundred functions.

Since three hundred different or independent functions may be completed by energization of three hundred final stick relays these same stick relay circuits may be deenergized by the absence of the three different function tones so this invention in all provides a total of six hundred functions for a total of eight different tone frequencies over two line wires.

The circuit comprising this invention may be viewed from different viewpoints. There are eight different tones. This can be multiplied to extend the circuit functions. If they are not needed then one tone may be employed as a spare and the tone transmitter and receiver may be quickly connected to replace a faulty or off tuned tone generator and receiver.

The circuit is initiated by a function request made through a hand switch, toggle switch, relay or any other mode of circuit closing device. A high speed X relay with one millisecond drop out time may detect the transfer time of a fast switch. Such a relay may energize one of ten CD or code determining relays and an ST or start relay and close its contacts for each of the three keying relays. The start relay initiates the operation of a progressive closing means to produce a first pulse for the purpose of selecting one of ten group relays, an open time sufficiently to permit the tone receiver relays to drop out, second pulse for the purpose of selecting one of ten function relays under the influence of the selected group relay and through it the final stick relay.

Other objects and advantages appear hereinafter in the following description and claims.

The accompanying drawings show for the purpose of exemplification without limiting this invention or the claims thereto, certain practical embodiments illustrating the principles of this invention; wherein FIG. 1 is a schematic circuit diagram of the transmitter comprising this invention.

Figure 1:
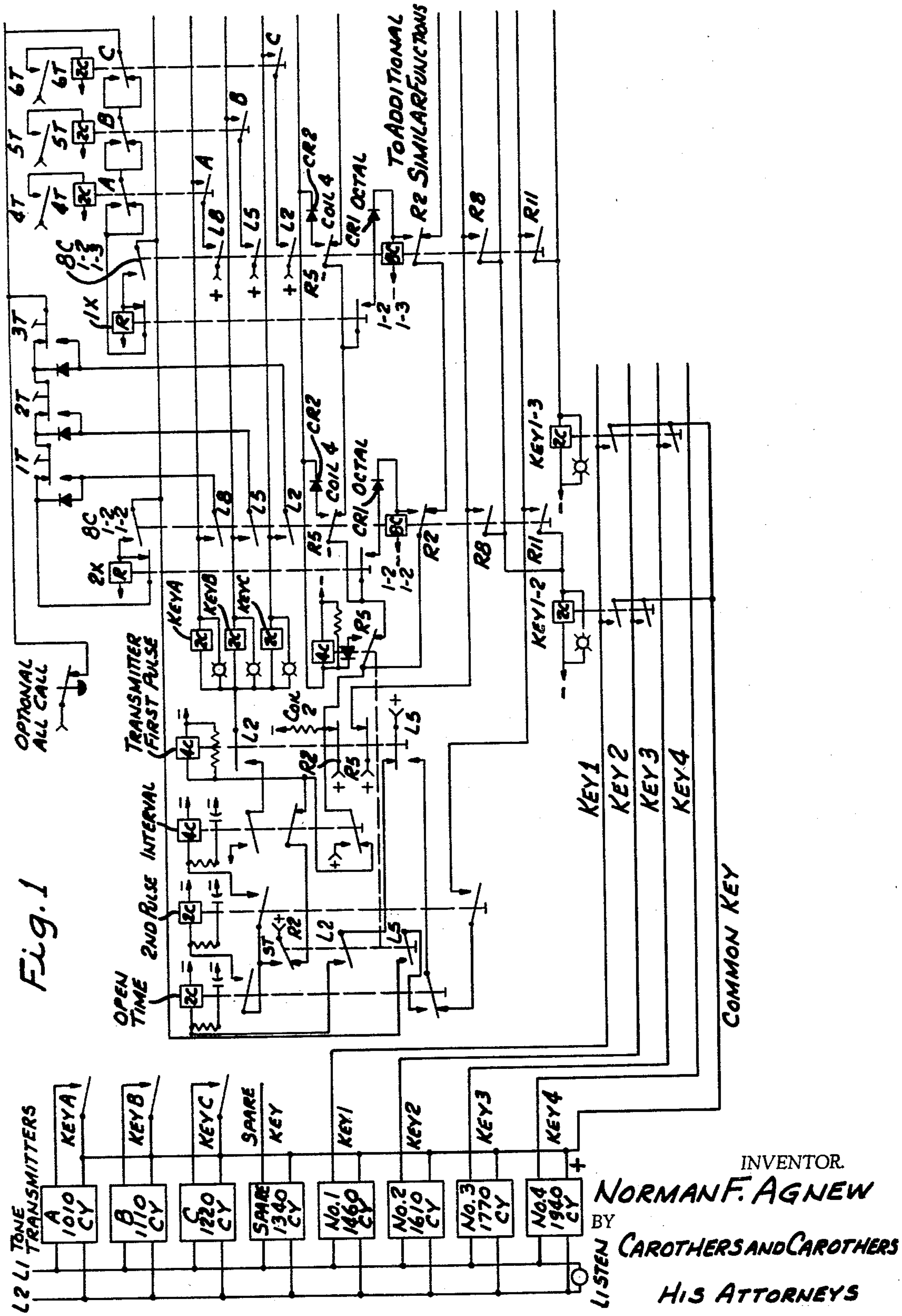

Referring to FIG. 1 of the drawings the coded tone supervisory system illustrates the information to be transmitted in the form of a manual function switches 1T, 2T and 3T at the top of the circuit. Such switches are indicated as being manually operated; other types of switching means may be employed as illustrated by the input repeater relays 4T, 5T and 6T, each of which is actuated by a form A switch or other contact making device which may be manually operated or operated by any suitable function means that spells out the function to be transmitted.

As illustrated it is, of course, obvious that the form C manual function switches 1 to 3 could also be operated by any other type of device which when actuated is to start the function in the signalling system.

Figure 3:
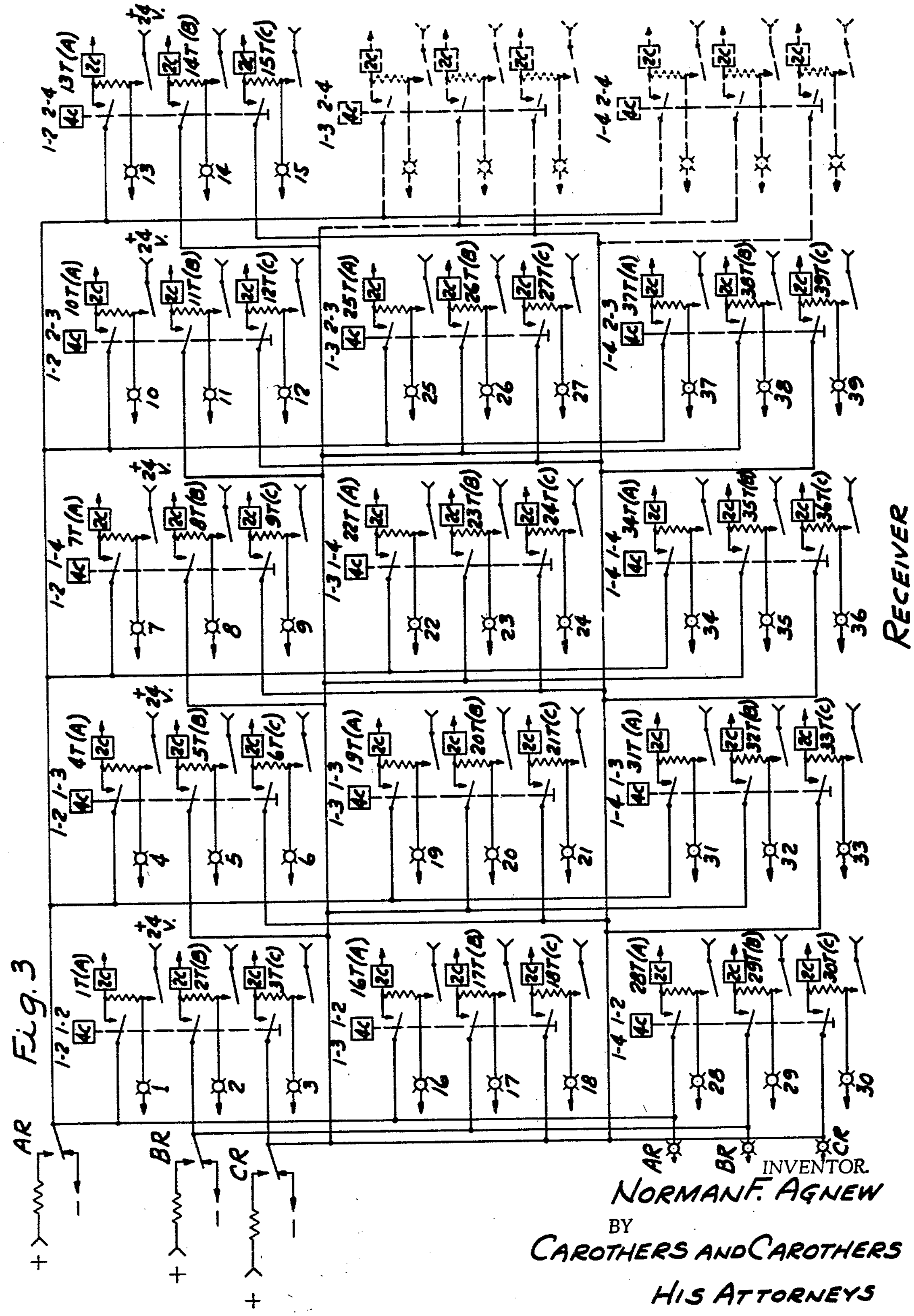
FIG. 3 is a schematic circuit diagram of the final output relays selected by the code sequence relay of FIG. 2.

Only three manual function switches with the form C contact are indicated and there are only three input repeater relays indicated which are actuated by an external connection of a form A contact type; however, any number of each of these groups of information selecting devices may be employed as needed to produce the function desired at some remote station and as illustrated in FIG. 3 of the drawings there are forty-five of such receiver function relays illustrated although this, of course, does not match the number of information selection means in FIG. 1, it is demonstrative of the fact that the extent of this circuit in transmitting information by means of a multiple pulse on multiple bursts of tones is practically limitless. Thus the circuit is expandable to make the number of functions transmitted over two wires to be an indefinite number. However, as shown and described herein one or two functions will be followed through the circuit to disclose and demonstrate the utility of the circuits comprising this invention.

Figure 2:
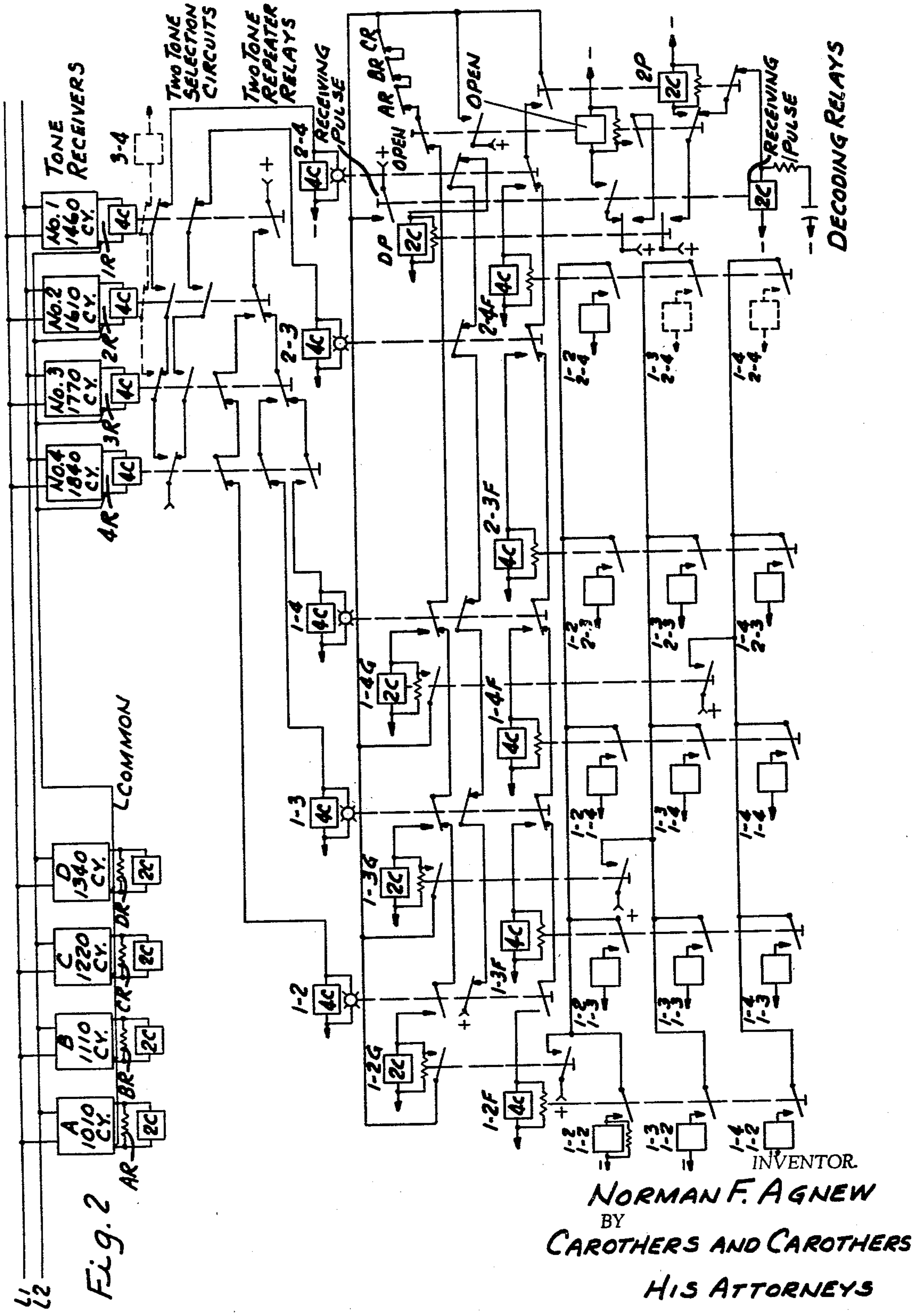
FIG. 2 is a schematic circuit diagram of the code sequence receiving circuit.
Figure 4:
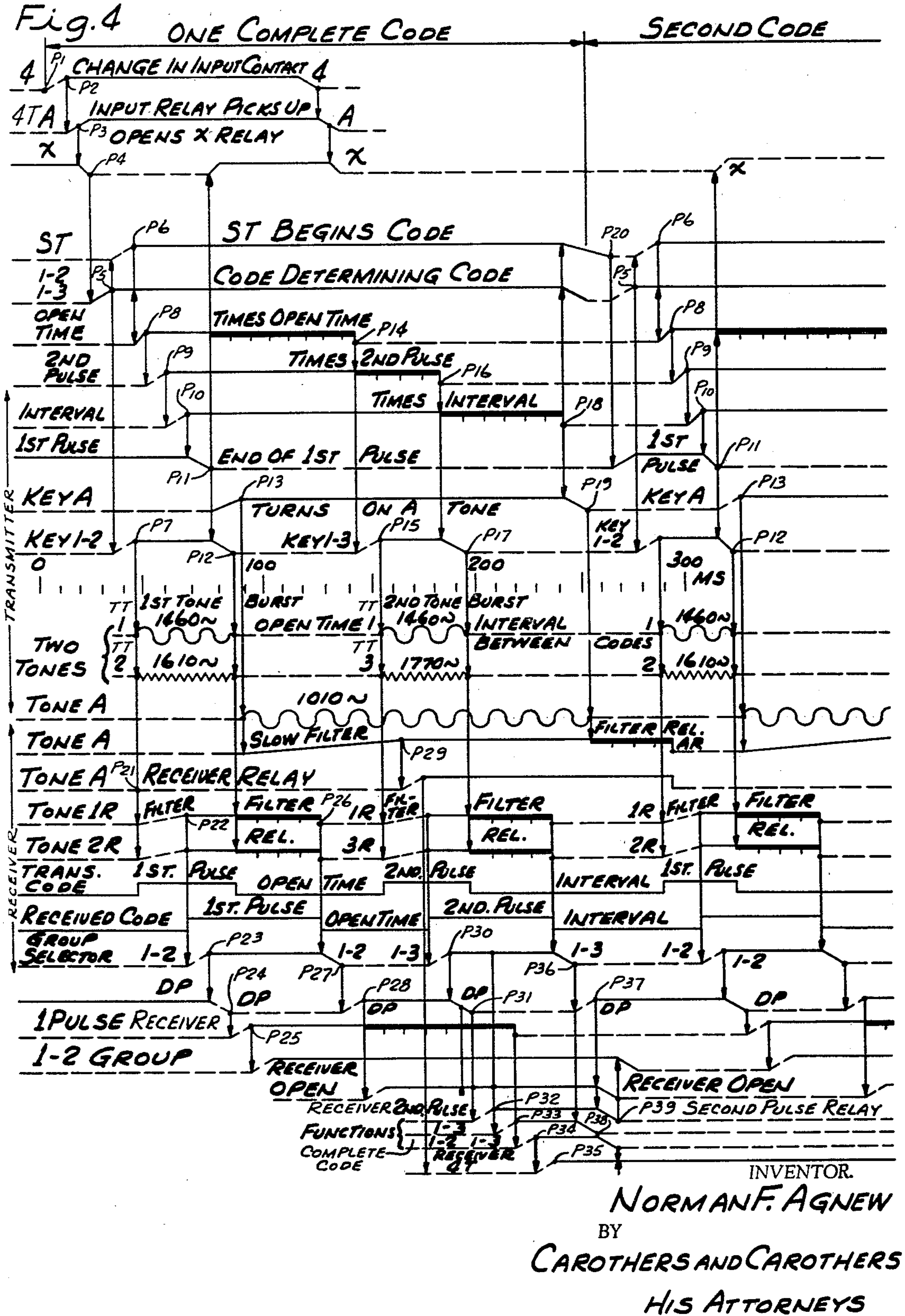
FIG. 4 is a relay timing chart showing the sequential operation of the selected code as carried through FIGS. 1, 2 and 3.

Referring back to FIG. 1 the circuits to be described and followed through each of the circuit diagrams of FIGS. 1, 2 and 3 are spelled out in the relay timing chart of FIG. 4 wherein the external contact connection of form A as indicated at 4 is closed to connect a positive twenty-four volt preferably DC supply to one side of the operating coil of a 4T relay which is an input repeater relay, the other side of the operating coil is connected as indicated to ground or negative source of supply.

The 4T relay upon being energized closes its 4T contact between 4T2 and 4T3. This transfer opens an existing circuit as traced from positive through the optional all-call switch through the contacts 2, 1 of the 6T input repeater relay the contacts 2, 1 of the 5T input repeater relay and the contacts 2, 3 of the energized input repeater relay 4T. The transfer of the latter contact interrupts a current to the relay 1X causing it to drop its stick contact and this particular 1X relay is a relay that selects the code determining relay 1–2:1–3 relay.

As shown in FIG. 1 when relay 1X drops, its contacts 4, 5, closed which complete a circuit from the positive voltage through the front contacts R2 and front contact 3 of the first pulse relay thence through the contacts R5 and back contact 4 of the ST relay thence through the contact R5 and the back contact 4 of the 1–2:1–2 code determining relay thence through the contact 5 to the back contact 4 of the 1X relay thence through the diode CR1 to one side of the operating coil of the 1–2:1–3 code determining relay, the other side of the operating coil of which is connected to ground return.

The energization of this code determining relay is also demonstrated on the fifth line of FIG. 4 and each sequence described is shown in lines 1, 2 and 3.

The energization of this code determining relay completes a circuit from the R5 contact to the contact 6 of the first pulse relay to the front contact 9 and the R8 contact of the code determining relay 1–2:1–3, thence to the key 1–2 relay which energizes the same closing its front contacts 3 and 6 to connect the common positive circuit with the respective tone transmitters 1 and 2.

As shown in FIG. 4 the key 1–2 relay which when energized at point P7 connects the first tone burst of 1460 cycles and 1610 cycles to the transmission line indicated as L1 and L2 in FIG. 1.

Referring again to FIG. 4 the point P7 was in fact not reached before point P6 which represents the energization of the starting relay ST which is initiated by the energization of the code determining relay 1–2:1–3 closing its contacts R5 and 6 to complete a circuit from positive voltage source through the contacts R2 and 3 of the first pulse relay, thence through the contacts R5 and back contact 4 of the ST relay which we are about to energize, thence through the contact R5 and the back contact 4 of the code determining relay 1–2:1–2, thence through the code determining relay contacts R5 and front contact 6 of the code determining relay 1–2:1–3, thence through the diode CR2 and thence to one side of the operating coil of the start relay ST, the other side of which is connected to ground or negative as indicated. This relay will pick up in a sufficient time and form its own stick circuit through its contacts R5 and front contact 6 within the period of time that is required to transfer the heel R5 from the back contact 4 to the front contact 6 which forms a stick circuit to maintain the ST relay energized through the CR3 diode as shown.

The ST contact L2 closes with its front contact 3 to supply current to one side of the operating coil of the open time relay, the other side of which is connected to ground return which energizes this relay as indicated in FIG. 4 to point P8.

The closing of the ST contact R2 and front contact 3 connects positive voltage supply to the open time contacts 2 and front contact 3 to supply voltage to one side of the operating coil of the second pulse relay, the other side of which is connected to negative return. This is shown from P8 in FIG. 4 and the second pulse relay becomes energized at P9 which in turn closes its contact 5 with its front contact 6 to supply voltage from the front contact 3 of the ST relay to one side of the operating coil of the interval relay, the other side of which is connected directly to ground return. Again referring back to FIG. 4 this sequence is shown in carrying P9 to P10 and the energization of the interval relay at P10 raises its contact R5 from the back contact 4 to open the holding circuit of the first pulse relay which was supplied through the stick circuit contact R2 and front contact 3 of the first pulse relay. This progresses our circuit to P11 in FIG. 4 and the opening of the first pulse relay does two things. It turns off relay key 1–2 at P11 which progresses to P12 and P13 indicated in FIG. 4 the energization of relay key A which is connected from code determining relay 1–2:1–3 through its closed contacts L8 and front contact 9 thence to contact 5 and front contact 6 of 4T the input repeater relay and thence to one side of operating coil of relay key A the other side of which is connected through the first pulse relay contacts L2 and back contact 1 and thence through the interval relay contacts R2 and front contact 3 which as indicated is connected to ground return.

Referring back to FIG. 4 the point P13 is indicated as starting the tone A frequency of 1010 cycles on the line. This is effected by the contacts 2 and front contact 3 of relay key A closing the power circuit to the tone transmitter A for delivering 1010 cycles to the lines L1–L2.

Referring to FIG. 4 the next point in time for the purposes of this disclosure is indicated at P14 wherein the open time relay which was actually cut off by the de-energization of the first pulse relay in opening its contact L5 with front contact 6 was effectively de-energized at the time P11 was. However, this being as indicated a time delay in opening relay will maintain its front contacts closed for the period between P11 and P14 which actually represents the open time interval between the first tone burst of tone transmitters 1 and 2 and the second tone burst of tone transmitters 1 and 3.

When open the relay actually drops as indicated at P14 in FIG 4, it opens its front contact 3 thereby cutting the supply of current to the second pulse relay. However, this relay is also indicated as a time delay relay and its front contacts stay up for the allotted time period which time period in delay in opening actually controls the length of the second tone burst as illustrated in FIG. 4. This second tone burst is illustrated by the closing of the relay key 1–3 the point P15 which circuit is completed through the code determining relay 1–2:1–3 having its contacts R11 and front contact 12 closed, thence through the front contact 3 and contact 2 of the second pulse relay, thence through the back contact 4 and heel 5 of the open time relay and thence through the back contact 4 and the heel L5 of the first pulse relay to positive voltage supply. Thus the relay key 1–3 is energized and closes at point P15 by the dropping out of the open time relay and during the time delay period of the second pulse relay. Relay key 1–3 closes its front contacts 3 and 6 to operate tone transmitters 1 and 3 respectively which transmits the tone bursts of 1460 cycles and 1770 cycles respectively on lines L1 and L2 for the time delay period of the second pulse relay that drops out the relay key 1 and 2 as indicated at P16 of FIG. 4 and P17 wherein the contacts of the relay key 1–3 actually open.

The next point in time if P18 which represents from P16 the total interval of time delay of the interval relay and when this relay drops its front contact 3 opens the circuit of relay key A which when open at P19 removes the tone transmitter frequency of 1010 cycles when the front contact 3 of the relay key A is disconnected.

Referring again to FIG. 4 P18 which indicates the opening of the contacts of the interval relay disconnects the positive potential from its front contact 6 to its R5 contact to de-energize the ST relay through the ST stick contact between R5 and R6 of the ST relay. This same circuit also interrupts the voltage between the stick circuit of the code determining relay 1–2:1–3 causing it to drop out. This then brings us to the position P20 of the timing chart of FIG. 4 which places positive potential through the ST contacts R2 and back contact 1 the interval relay contacts 2 and back contact 1 to the operating coil of the first pulse relay and thence to ground return. This circuit would not be affected until the ST relay was de-energized and the interval relay was de-energized and thus P20 brings us back to the initial starting point setting the circuit up for the next selected information from the manual function switches 1T, 2T, or 3T or from the switches 4, 5 and 6 or other functions not illustrated or otherwise shown in FIG. 1. The dropping out of the code determining relay 1–2:1–3 opened the stick circuit of the 1X relay which sets this portion of the circuit in readiness for the next information to be transmitted over the lines L1, L2.

From FIG. 4 it is seen that we have transmitted a first burst of tones from tone transmitter 1 and tone transmitter 2 and a second burst as tone transmitter 1 and tone transmitter 3. However, simultaneously we also transmitted from tone transmitter A a tone from period P13 to period P19. These tone bursts are then received by the lines L1–L2 as shown in FIG. 2 by each of the tone receivers A, B, C and 1, 2, 3 and 4 indicated in FIG. 2. Tone receivers as shown in FIG. 2 are made up of a filter for receiving the specific frequency noted which in turn is amplified sufficiently to operate their respective relays. Each of these tone receivers will pick up their respective tone frequencies and energize their respective relays indicated as 1R, 2R, 3R and 4R and the other set of tone receivers will energize their respective relays AR, BR, CR and DR, all of which receivers are connected directly to the lines L1, L2.

As previously stated the first tone burst of two frequencies was impressed on the line L1–L2 at point P7 which if referred to in the receiving portion of the relay timing chart of FIG. 4 is point P21. This first burst of tone frequencies are shown to energize the tone relays R1 and R2 in accordance with the two frequencies received. These R1, R2 relays are picked up at point P22 and collectively their contacts pick up the group selector relay GS1–2 as indicated at point P23. Referring now to FIG. 2 positive voltage is supplied to contact R2 to front contact 3 of the 1R relay which current flows through the contact R2 and the front contact 3 of relay 2R and thence through contact R5 and back contact R4 of relay 3R and thence through contact L2 and back contact 1 of relay 4R to one side of the operating coil of the relay GS1–2 the other side of which is connected directly to a ground return. Upon the energization of GS1–2 each of its contacts are closed one of which notably back contact L2–1 opens its circuit to cut off the positive voltage supply through the circuit including the back contact L2–1 of the GS1–3 relay and thence the back contact L2–1 of the GS1–4 relay and thence through the back contact L2–1 of the GS2–3 relay thence through the back contact 1 and contact L2 of the GS2–4 relay to interrupt the circuit maintaining the energy on the DP relay the other side of which is connected to ground return.

Upon the opening of the DP relay its back contact 1 and contact R2 completes a circuit from positive voltage through the back contact 4L5 of open receiver relay OR and thence to back contact 1, contact R2 of the second pulse relay 2PR and thence to the first pulse receiver relay 1PR the opposite sides of the operating coil of which are connected to ground return. Relay 1PR becoming energized closes its front contact 6, contact 5 to connect positive voltage source supply through a series of back contacts CR, BR and AR which are the ABC repeater relays and through the back contact of the 1–R2 of the open relay OR thence through the back contact 4, contact L5 of GS1–4 thence through the back contact 4, contact L5 of the GS1–3 thence to the front contact 6, the back contact L5 of the GS1–2 relay which is energized and to one side of the operating coil of the 1–2G relay, the other side of the operating coil being connected directly to ground return.

When 1–2G relay is energized it closes its front contact 6, back contact R5 which sets the circuit for future completion in supplying a current to a bus line for energizing any one of the receiving function relays 1–2:1–2, receiving function relay 1–2:1–3 and etc. This completes the energization of the relay of the first tone burst and is represented by the point P25 in the relay timing chart of FIG. 4 which is a function group relay 1–2G.

The next point would be P26 which represents the time required for the tone receiver relays 1R and 2R and represents the delay time from point P12 to point P26 for both of these relays and as shown on the chart represents the end of the first pulse insofar as the receivers are concerned.

At this time point P26 the group selector relay GS1–2 becomes de-energized because of the dropping out of the 1R, 2R relays and as soon as relay GS1–2 drops out at point P27 it again energizes through its back contact L2 the energization of the DP relay which is indicated in FIG. 4 at point P28. When the DP relay becomes energized, it will open the 1PR first pulse receiver relay which is a time delay relay in opening and which as shown to remain on but has no significance in its drop and so is not given a P time interval in FIG. 4.

At the same time DP front contact 6, contact 5 when closed connects a positive voltage supply through 1PR contacts 2 and front contact 3 to energize the OR or receiver open relay the other side of which is connected to a negative return and upon the energization thereof its front contact 6 and contact R5 connects positive potential to maintain the stick circuit for 1–2G until after the time delay of 1PR which opens the stick circuit through its front contact 6 and contact 5.

Referring again to FIG. 4 it will be noted that the transmitter tone A is responsive for the energization of the receiver tone A the relay of which is indicated at AR and is picked up at point P29. This relay has its AR back contacts 4, 5 and opens the initial pick up circuit to the group relay of the first burst of two tones 1–2G which point is, of course, subsequent to the time of pick up of the OR relay which maintains the stick circuit of this same group relay which is slightly after point P28 on FIG. 4.

The next point of consideration is the operation of the tone receivers 1 and 3 by reason of the second tone burst which initiated the operation of the relays 1R and 3R and which in turn energizes group selector relay GS1–3 which is shown in the same line as GS1–2, and which relay when energized as indicated at P30 in FIG. 4 will open the energization of DP relay by opening its back contacts 1 and contact L2. When DP relay becomes opened its back contact 1 and contact 2 connects positive potential to the front contact 6 and contact L5 of the OR relay which in turn is connected directly to one side of the operating coil of the relay 2PR which is second pulse receiving relay. This relay picks up as indicated at point P32 and its front contact 6 and contact 5 completes a circuit from a positive source of current supply and the OR front contact 6, R5 contact through the front contact 6, 2PR contact thence the back contact 4R5 of the GS2–4 relay, the back contact 4R5 of the GS2–3 relay the back contact 4R5 of the GS1–4 relay and the front contact 6, R5 contact of the GS1–3 relay which is now energized for the purpose of supplying the voltage to one side of the operating coil of the 1–3F relay the other side of which is connected to ground return.

On FIG. 4 this places the relay timing chart at point P33 wherein the contact of relay 1–3F energizes or completes the circuit of the function code receiver relay 1–2:1–3R. This relay is shown at the top of the second column in FIG. 3 and its front contact 3L2 upon being closed supplies current through the front contact 3, contact 2 of the AR tone receiver thence to the front contact 3, contact L2 of the 1–2:1–3R relay to energize relay R4T which represents the receiver relay for the function 4T that initiated this circuit as the independent repeater relay shown in FIG. 1, which function is the closing of the front contact 3 and contact 2 of the R4T relay to supply a holding current for this relay and also light the lamp as indicated and the opposite side of which is connected to ground return.

Of course, the lamp as closed by this relay represents any one of many functions that the R4T relay would perform. It is being merely simple in this illustrative diagram to illustrate that the function is merely the turning on of a light. This places our relay timing chart at P35 and takes place prior to the end of the second pulse which extends as shown into the interval time and at the end of this current decaying period in the tone receivers 1 and 3 the GS1–3 will be disconnected by the de-energization of GS1–3 which in turn will re-energize the DP relay and at the same time will de-energize the 1–3F relay as indicated in the time chart of FIG. 4 at P34.

As indicated by the point P35 the DP relay is again picked up which drops out the OR relay by opening up its stick circuit and also opens up the 2PR relay which is the second pulse receiver relay by the opening of the back contact DP1 at approximately the same time or maybe slightly one way or the other at point P36 the opening of the 1–3F functioning relay in turn opens the relay 1–2:1–3R relay which is the complete code relay which when it opens leaves the R4T receiver function relay energized with the function of the light being lit completed.

Referring now to FIG. 4 at the opening of the relay 2PR or the second pulse relay and the OR relay the 1–2G group relay of the first burst of two tones is de-energized and the whole of the circuit is then in readiness for the next signal.

The AR relay which is responsible for supplying current for this purpose becomes de-energized after the current of the filter dies down as shown at the end of the continuous tone transmission of tone A. Thus the AR relay becomes de-energized as the last function in resetting the circuit for the next signal which in time is P38.

The balance of the chart as shown in FIG. 4 merely indicates the start of the first tone burst for the next signal which is initiated on the transmission line slightly before the AR relay drops out. This overlapping time is insignificant and insufficient to complete any circuits. However, the time chart shows the initiation of the next signal which may be selected from any one of the functions as referred to in regard to FIG. 1 to perform in the receiving end to light any one of the lights to be shown as the function to be produced as illustrated in FIG. 3.

Although the first and second bursts of two tones is employed in the foregoing circuit the use of two tones in each burst multiplies the number of functions that may be produced by twice the number of tones employed in the circuit.

In the circuit just described there are four tones used for function selection purposes and the coding of any two out of four allows the selection of six different groups and then in turn coding of any two of these tones in the second burst allows the selection of six more functions under each of the original groups making a total of thirty-six functions for the example shown and thus the switches 1T to 6T would in fact be represented by thirty-six of such switches. A, B, C, D allows the use of three control tones. A, B and C allows control of three different functions under the same selection code determined by the coding of the four tones just described.

The spare tone transmitter may be employed as a fifth tone transmitter to increase the combination or it may function as the fourth control tone transmitter or it may be employed as a spare for any one of these tone transmitters. The use of a burst of two tones permits this circuit to be drawn so that the two tones function as a security measure in transmitting the function selected as against a circuit employing only a burst of one tone. However, this invention contemplates the use of the system as two bursts of one frequency each as well as two bursts of one frequency in combination with a burst of two frequencies or as previously described two bursts each of two frequencies or tones.

This is clearly brought out in FIG. 2 in considering the tone receivers that energize the relays 1R, 2R, 3R and 4R wherein the circuit shown requires the energization of two and only two relays to complete a function selection and if any one of these tones fail in transmission or reception the function could never be carried out which places this coded indication system as a positive safety circuit in preventing the application of an incorrect function upon the failure of one tone or more. This security measure provides an important factor to this coding system as well as to multiply the capability of the system in transmitting many more functions such as 36 as previously stated.

Figure 5:
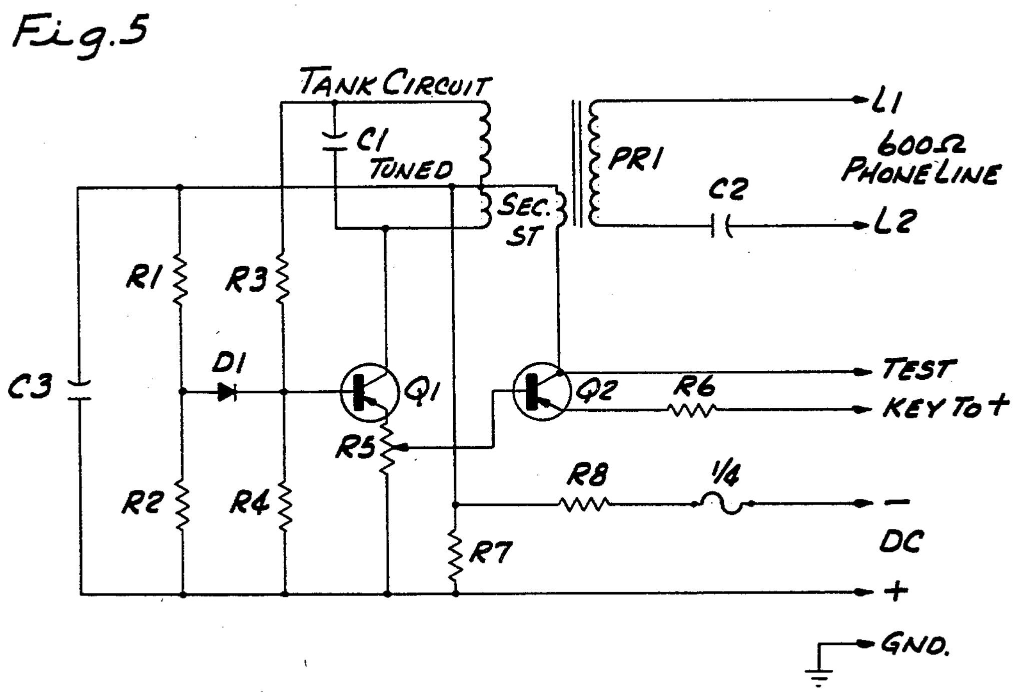
FIG. 5 is a schematic circuit diagram of a plug in tone transmitter as shown in FIG. 1.

The eight tone transmitters as illustrated in FIG. 1 as being connected to lines 1 and 2 are each illustrated in FIG. 5 wherein the positive and negative direct current is directed with the positive being the common and the negative being supplied between the two coils ST and WY of the oscillating circuit which coils connected in series are placed in parallel with the condenser C1 one side of which is connected through the resistance R3 to the base of the transistor Q1 the collector of which is connected to the opposite side of C1. The emitter of Q1 is connected through the resistance R5 to common and a voltage divider circuit is provided by the resistances R1, R2 the diode D1 and the resistance R4 with the condenser C3 connected across the input voltage. The resistance R5 has a variable tap connected to the base of the transistor Q2 the collector of which is connected to the secondary of the transformer the primary of which is connected across lines 1 and 2 with the condenser C2 in series. The negative power supply which is connected between the coils ST and WY of the oscillating circuit is also connected to the other side of the secondary. The resistance R7 is connected across the input power circuit in multiple with the condenser C3 for the purposes of providing a well-filtered supply for the collector circuits. By properly selecting the end capacitor C1 and the coil ST and WY in the oscillating circuit the chosen frequency for supplying line L1, L2 is determined. Although specific frequencies have been assigned in the foregoing description it is, of course, understood that any suitable frequency that is not too close to any other frequency of the tone transmitters may be selected and used. The circuit is, of course, not confined to such weaknesses. To key this transmitter circuit the emitter of transistor Q2 is connected through the resistance R6 to the circuit as shown in FIG. 1 and when the positive supply and the opposite side of resistance R6 are connected the circuit is allowed to send out its tone pulse for as long as this circuit is maintained.

Figure 6:
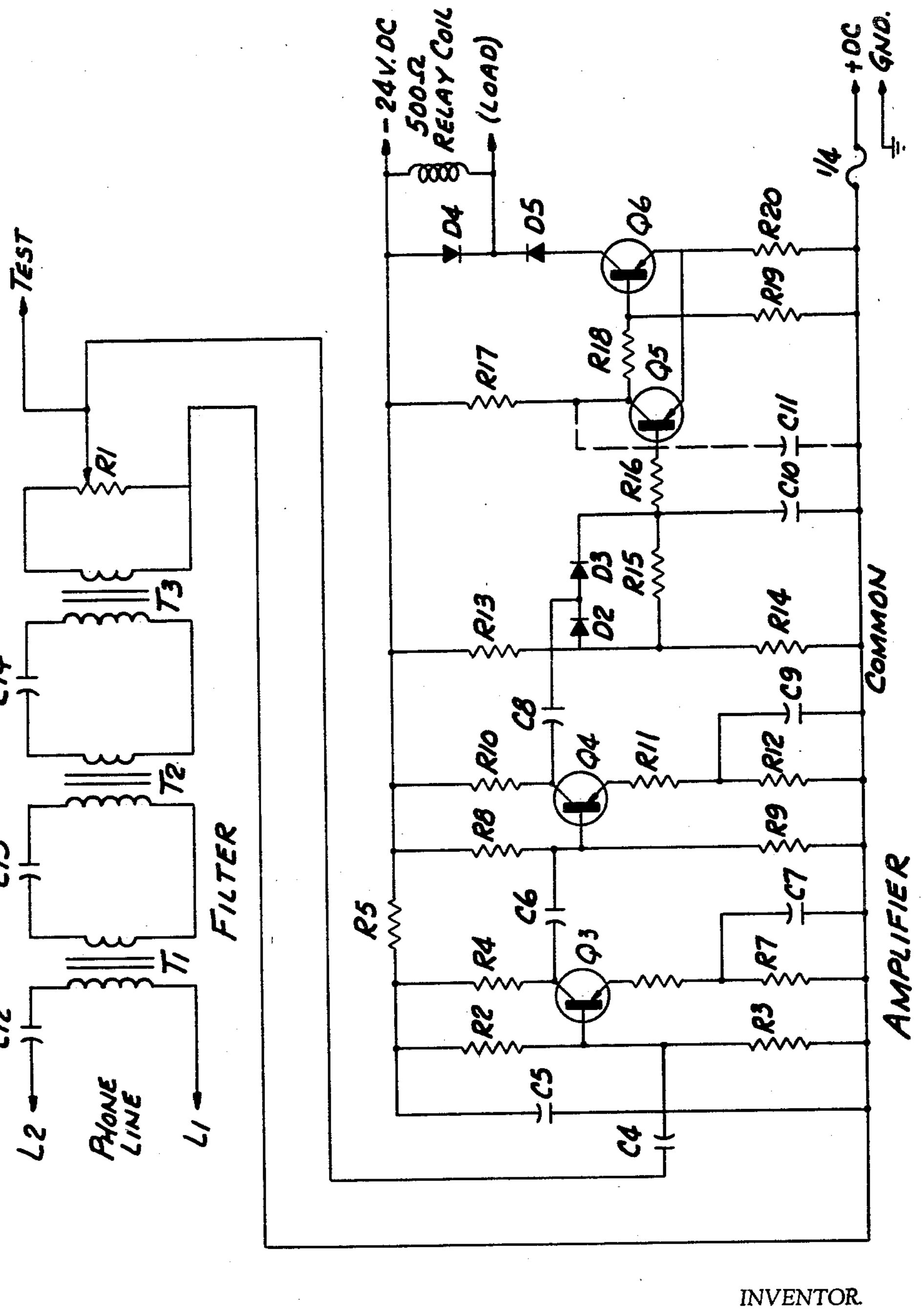
FIG. 6 is a schematic circuit diagram of a plug in tone receiver shown in FIG. 2.

As a counterpart the tone receivers are illustrated in FIG. 6 wherein the filter has one end connected to lines 1 and 2 and merely represent a series of three transformers T1, T2 and T3 the primary circuit of each being connected in series with a capacitor C12, C13 and C14 which represents a simple frequency selective filter circuit which tunes out those undesirable frequencies and allows only the selected frequency to be supplied to the amplifier one side of which is connected to positive DC represents the common and the other side of which is connected through the condenser C4 to the base of Q1 which in turn is connected to the condenser C8 and midpoint between the diodes D2 and D3 which are arranged in the same direction to charge capacitor C10 so as to cut off transistor Q5 which in turn causes transistor Q6 to conduct thereby energizing the output relay for that tone receiver. The filter circuit as shown in FIG. 6 is the only portion of the tone receiver that changes, the amplifier circuit being the same for every frequency.

Figure 7:
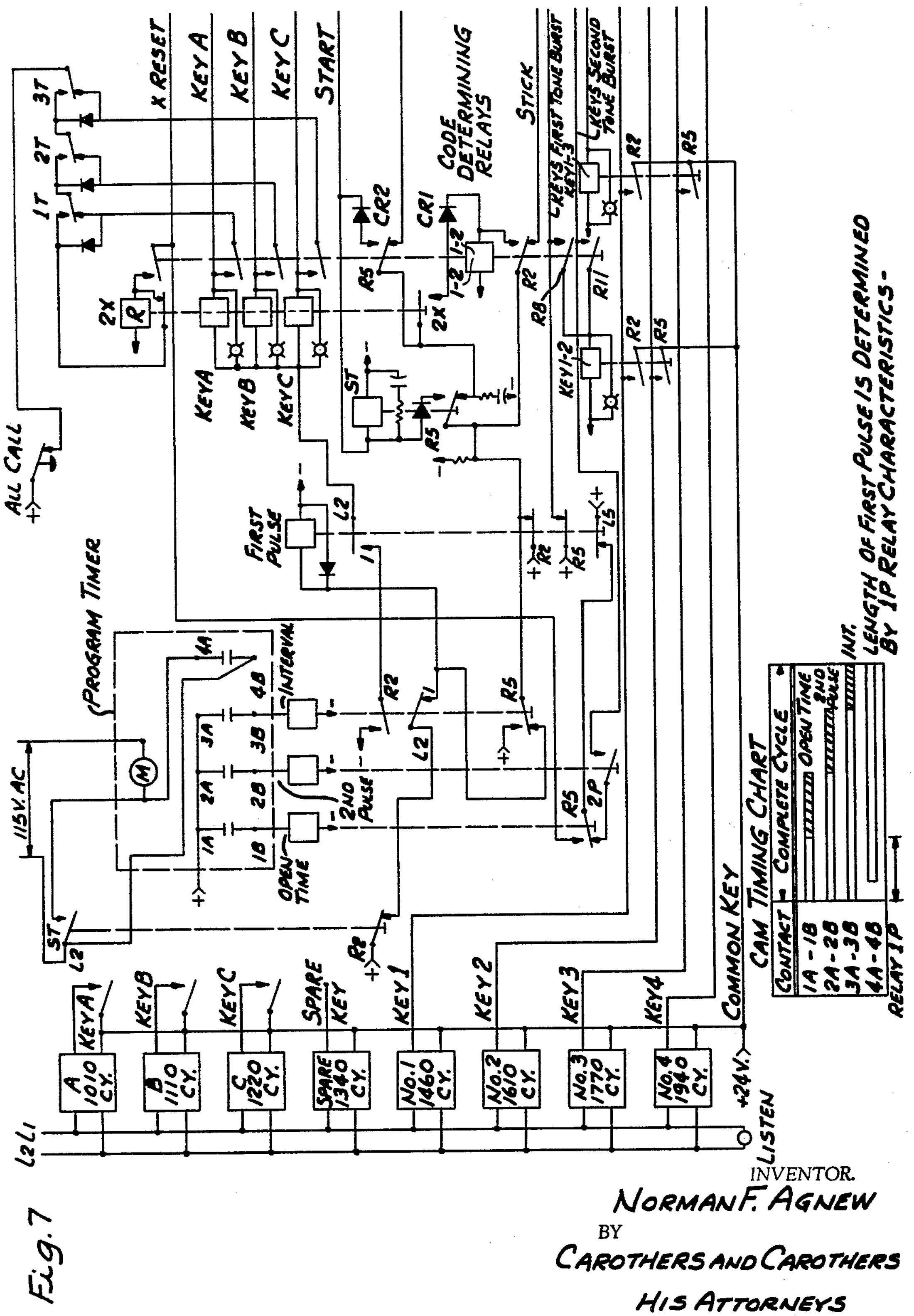
FIG. 7 is a schematic circuit diagram of a timer operated transmitter circuit comprising this invention.

Referring now to FIG. 7 the manual function switches 1T, 2T and 3T are shown in a circuit similar to that of FIG. 1 and are connected in a similar manner and normally energized 2X relay is dropped during the transfer of one of these manually operated switches 1T, 2T or 3T which interrupts the circuit of relay 2X causing it to drop out. The dropping out of the 2X relay closes its back contact 4 with contact 5 to complete a circuit from positive voltage supply through front contact 1, R2 of the front contact 3R2 of the first pulse relay which is normally energized thence through back contact 4R5 of the ST relay thence through the back contact 4 and contact 5 of 2X relay thence through the diode CR1 to code determining relay 1–2:1–2 which when energized closes its front contact 3 and R2 to form a stick circuit from the same source of supply.

The energization of code determining relay 1–2:1–2 closes a circuit from positive supply through contact R5 and front contact 6 of the first pulse relay to front contact 9R8 of the 1–2:1–2 code determining relay to relay key 1–2 to energize the same the other side of the operating coils of which are connected to ground return. Relay key 1–2 then closes its front contacts 3 and 6 to energize the tone transmitters 1 and 2 respectively.

At the same time the front contact 6 and contact R5 of code determining relay 1–2:1–2 closes a circuit from a positive source of supply through the front contact 3 of the first pulse relay, the back contact 4 of the ST relay, the front contact 6 of the code determining relay 1–2:1–2 and CR2 to the ST operating coil the other side of which is connected to ground return. Even though this pickup circuit is through the back contact 4 of the ST relay the impetus is sufficient to cause the relay to break the pickup circuit and still make the holding relay through the ST relay R6 and the diode shown.

The energization of the ST relay closes the front contact of the ST relay to place alternating current voltage across the synchronous motor which starts the same to operate the program timer that is provided with four contacts the sequence of which is given in the table in this figure, from which time the first three contacts close the circuits to energize the first time relay the second time relay and the interval relay and the fourth contact between 4A and 4B is started slightly after the starting of the synchronous motor to maintain the program timer in operation for the time for which the same has been set manually after which period the contacts 4A, 4B are opened to stop the synchronous motor and reset the same for the next cycle.

As soon as the interval relay is energized it closes its front contact 3 to R2 to connect the ground or return side to the back contact 1 of the first pulse relay to L2 which in turn supplies negative voltage to each of the key relays A, B and C. Since the code determining relay 1–2:1–2 is energized each of the relay keys are connected to their respective switch 1T, 2T and 3T and that switch which has been moved to the lower contact position such as indicated at 1T will supply current to the 2X to the key A relay which in turn closes its front contact 3 to place the tone transmitter on the line L1, L2.

When first pulse relay is de-energized supply voltage is connected to its back contact 4 and thence to contact R5 and front contact 6 of the open time relay and thence through front contact 1–2 of the code determining relay 1–2:1–2 to energize the 2X relay which when energized provides its own stick circuit through front contact 3 and the back contact of switch 1T. 2X being again energized is merely reset for the next operation.

When the first pulse relay is de-energized its front contact 6 is open to de-energize the relay key 1–2 thus removing the first burst of two frequencies from the lines L1, L2.

The next sequence is indicated in the cam timing chart wherein the open time relay becomes de-energized and it transfers its contact R5 from front contact 6 to back contact 4 thereby completing the circuit from positive voltage through contact LS to back contact R4 of the first pulse relay, contact R5 and back contact 4 of the open time relay, contact R2 in the contact R3 in the second pulse relay and front contact R12 and contact R11 of the code determining relay 1–2:1–2 which again energizes the relay key 1–2 again closing its front contacts 3 and 6 which again places the second burst of two impulses comprising the tone transmitters 1 and 2 on the line L1, L2.

Returning again to the cam timing chart the second pulse relay opens at its specific period of time thus dropping its contact between front contact 3 and R2 and de-energizing relay key 1–2.

We then refer to the cam timing chart wherein the interval relay terminates ahead of the complete cycle as indicated on the chart to drop its front contact 3 and thereby de-energize relay key A which in turn opens its front contact 3 to remove the tone transmitter A from the line L1, L2.

The interval relay also drops its front contact 6 to de-energize the ST relay through its own front stick contact 6 and at the same time de-energize the code determining relay 1–2:1–2. The closing of the back contact 1 of the interval relay with the back contact 1 of the ST relay being closed re-energizes the first pulse relay.

At this time the contact 4A, 4B of the program timer opens owing to the completion of cycle and turns off the synchronous motor so that the circuit is again reset for the next function having transmitted two bursts of tones each with an intermediate tone of the relay key A to complete the transmission of a function in precisely the same manner as that described in FIG. 1.

Figure 8:
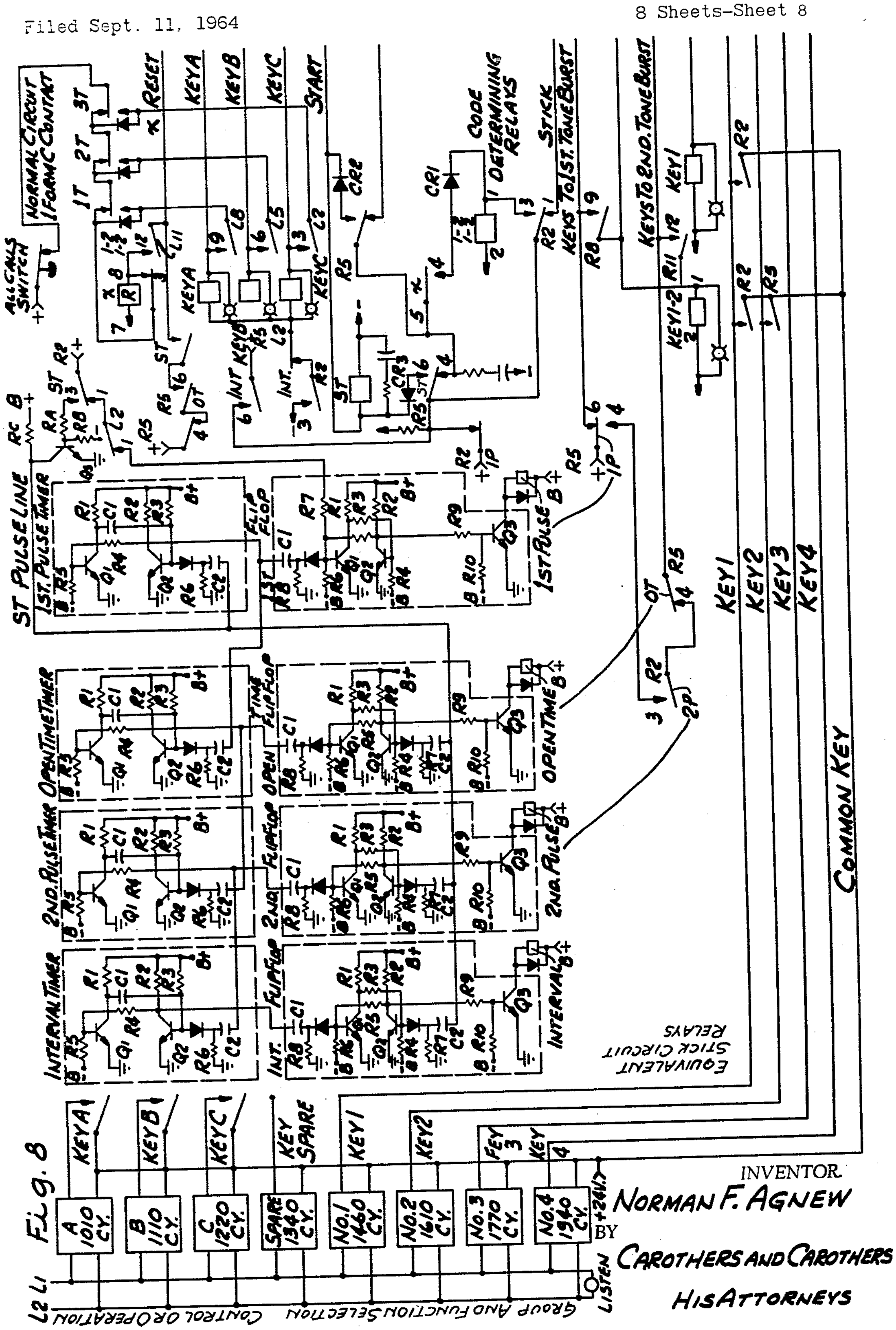
FIG. 8 is a schematic circuit diagram of a solid state transmitter circuit comprising this invention.

Referring now to FIG. 8 which employs transistors or what is otherwise considered as a solid state circuit in place of the open time relay and the second pulse relay and the interval relay of FIG. 1 and the corresponding relay of FIG. 1 each of which is supplied with a time delay relay such as illustrated in FIG. 4. A similar circuit as illustrated in FIG. 7 functions to do the same thing by the use of a timer wherein the open time, the second pulse and the interval relays were controlled by timing contacts that had a specific on and off period. The solid state transistor circuit as illustrated in FIG. 8 utilizes the same invention as in FIGS. 1 and 7 through the use of a timer circuit that controls the operation of an equivalent relay with a stick circuit to effect precisely the same effect of this invention. Thus we have three distinct types of apparatus that will control the same circuit to initiate and transmit a function to the receiving circuit as illustrated in FIG. 2 for the purpose of actuating the function as illustrated in FIG. 3. There are undoubtedly other types of apparatus that could be employed but the illustration of three distinct forms provide a showing that the invention is not limited to the structure as illustrated in any one of FIGS. 1, 7 and 8. Yet each of these figures are important in themselves in supporting their separate application of the invention and in that respect form a part of this invention.

Referring specifically now to FIG. 8 before going through the circuit in a step-by-step manner, let us establish the initial conditions of the solid state circuit used to perform the function of the first pulse relay, open time relay, second pulse relay and interval relay. The first pulse flip-flop is in a state such that transistor Q2 is cut off and transistor Q1 is conducting. This is a stable condition and allows the output of the flip-flop to supply base current for transistor Q3 through resistor R9 in such a way as to energize the first pulse relay. The first pulse relay is, therefore, energized. The other flip-flops; namely, the open time flip-flop, the second pulse flip-flop and the interval flip-flop are in the state where transistor Q2 is conducting and transistor Q1 is cut off in each case. Under this condition no base current can flow to the transistor Q3 of each circuit. Therefore, the transistors associated with the open time relay, the second pulse relay and the interval relay are not conducting, therefore, these relays are de-energized. Also the start pulse line transistor QS is initially cut off. This condition of QS causes the input capacitors of the open time flip-flop, the second pulse flip-flop, the interval flip-flop and the first pulse timer to be positively charged with respect to the logic supply common return. The initial conditions of the solid state circuit are now established.

Referring now to the manually operated input contacts shown at the upper right of FIG. 8 assume that switch 1T is manually transferred. This opens the stick circuit of relay X through its front contact 2, contact 3 the switch 1T the front contact of switch 2T front contact of switch 3T through the optional all call switch to positive voltage. Relay X is, therefore, de-energized closing its back contact 5, contact 4 applying positive voltage from positive supply through front contact R2 contact 3 of the first pulse relay back contact R5 contact 4 of the ST relay back contact 5 contact 4 of the X relay, diode CR1 to one side of the operating coil of the code determining relay 1–2:1–2, the other side of which is connected to common return. Code determining relay 1–2:1–2 is energized transferring its contacts to apply positive energy to the key 1–2 relay from positive supply voltage through front contact 6, contact 5 of the first pulse relay front contact 9, contact 8 of the code determining relay 1–2:1–2 to one side of the key 1–2 relay the other side of which is connected to common return. The front contact 3, contact R2 of the code determining relay 1–2:1–2 closes to establish a stick circuit from positive supply voltage through front contact 3, contact R2 of the first pulse relay. The front contacts 3, contact R2 and the front contact 6, contact 5 of the key 1–2 relay closes to key tone transmitters 1 and 2, thus placing the first burst of two frequencies on the transmission line L1, L2. Also when code determining relay 1–2:1–2 is energized its front contact 6, contact R5 closes to energize the ST relay from positive supply voltage through front contact 3 contact R2 of the first pulse relay back contact 4, contact R5 of the ST relay, front contact 6, contact R5 of the code determining relay diode CR2 to one side of the operating coil of the ST relay the other side of which is connected to common return. Back contact 4, contact R5 of the ST relay which is in the pickup circuit of the ST relay will transfer to front contact 6, contact R5 in a time fast enough to establish a stick circuit for the ST relay through diode CR3. The ST relay is now energized.

Front contact 3, contact R2 of the ST relay will close and supply base current for transistor QS from positive supply voltage through the ST contact 3R2 through resistor R*a* to the base of transistor QS. This base current will cause the base of transistor QS to become positively biased thus overcoming the negative bias supplied through R*b* to a negative source of supply. Transistor QS will now conduct current from the positive source of supply designated B+ through register R*c* through the collector of QS through the emitter of QS to logic common. This will cause the collector of QS to be clamped very closely to the logic supply common. The collector of transistor QS is designated as the ST pulse line on FIG. 8. Clamping the ST pulse line to common allows capacitor C2 of the first pulse timer to discharge through QS causing the base of first pulse timer transistor Q2 to go negative thus cutting off transistor Q2 of the first pulse timer and causing transistor Q1 of the first pulse timer to conduct current thereby clamping the collector of transistor Q1 of the first pulse timer near logic common. This causes capactior C1 of the first pulse timer to discharge through resistors R1 and R3 in such a manner as to maintain the base of transistor Q2 at a negative potential thus keeping transistor Q2 cut off. The collector of transistor Q2 now rises toward the positive supply voltage causing capacitor C1 in the first pulse flip-flop to be positively charged with respect to common and also causing capacitor C2 in the open time timer to be positively charged with respect to common. When capactior C1 of the first pulse timer becomes sufficiently discharged the base of transistor Q2 will again rise to a slight positive voltage. When this happens transistor Q2 will again conduct current and the collector of transistor Q2 will be clamped near logic common. This will deprive transistor Q1 of its base drive and the base of transistor Q1 will again become negative biased through resistor R5 through a negative source of supply thus causing transistor Q1 to cease conduction. Capacitor C1 will now be recharged to its initial condition from the positive supply voltage through resistor R1 through capacitor C1 through the base of transistor Q1 to logic common.

The first pulse timer has thus reset itself to its initial condition.

Capacitor C1 in the first pulse flip-flop will now discharge through transistor Q2 of the first pulse timer thus causing the base of Q1 in the first pulse flip-flop to be negatively biased in turn causing transistor Q1 to cease conduction of current. Collector of transistor Q1 now rises toward the positive supply voltage supplying base current to transistor Q2 causing transistor transistor Q2 to conduct current. The collector of transistor Q2 in the first pulse flip-flop will be clamped very closely to logic common thus depriving base current to transistor Q3. The base of transistor Q3 will become negatively biased with respect to logic common through resistor R10 returned to a negative source of supply. Transistor Q3 will now cease conduction of current thus de-energizing the operating coil of the first pulse relay.

Upon the closure of the ST relay front contact, contact R2 and the clamping of the ST pulse line near logic common capacitors C2 in the open time flip-flop the second pulse flip-flop and interval flip-flop each discharged through transistor QS to cause the aforementioned flip-flops to change state so as to cut off their transistors Q2 in each case and turn on their transistors Q1 in each case. At the same time the collectors of the respective transistors Q2 will rise toward positive supply and supply base current to their transistors Q3 in each case thus causing the transistors Q3 to conduct current. This will energize the open time relay the second pulse relay and the interval relay simultaneously which energization occurred before the opening of the first pulse relay.

When the first pulse relay drops from contact 6, contact R5 of the first pulse relay opens to remove positive supply from the key 1–2 relay which then drops out opening its front contacts 3 and 6 to remove the first burst of tone frequencies 1 and 2 from transmission line L1, L2. Front contact 3, contact R2 of the first pulse relay opens to remove the initial stick circuit for the ST relay and the code determining relay 1–2:1–2 but front contact 6, contact R5 of the interval relay had previously closed thus maintaining positive supply voltage to the stick circuits of the ST relay and the code determining relay.

At the same time that the first pulse relay was de-energized capacitor C2 in the open time timer also discharged through transistor Q2 of the first pulse timer. This discharge caused the base of transistor Q2 in the open time timer to become negatively biased thus causing transistor Q1 of this timer to conduct current. Capacitor C1 in this timer now discharges through resistors R1 and R3 in such a way as to maintain the base of Q2 negative for the time required to discharge C1 of this timer. This represents the time delay period of this open time timer. During this time input capacitor C1 of the open time flip-flop will become positively charged and also input capacitor C2 of the second pulse timer will become positively charged. At the end of the timing period the base of transistor Q2 in the open time timer will become positive thus causing this transistor to again conduct current and its collector will be clamped to logic common thus depriving base current to transistor Q1 in the open time timer which will cause transistor Q1 to be cut off and its collecor will rise toward the positive supply voltage and cause capacitor C1 to become re-charged thus placing the open time timer in its original initial condition.

Input capacitor C1 of the open time flip-flop will now discharge through transistor Q2 of the open time timer and also input capacitor C2 of the second pulse timer will discharge through transistor Q2 of the open time timer which initiates the operation of the second pulse timer and at the same time operates the open time flip-flop circuit to de-energize the open time relay in the same manner as that of the previous flip-flop circuit in opening the first pulse relay.

De-energization of the open time relay allows its back contact 4, contact R5 to close completing a circuit from positive supply voltage back contact 4, contact R5 of the first pulse relay; front contact 3, contact R2 of the energized second pulse relay; front contact 12, contact R11 of the code determining relay to one side of the key 1–2 relay the other side of whose operating coil is connected to common return thus closing its front contacts 3 and 6 to again place tone frequencies 1 and 2 on transmission line L1–L2.

In the same manner the second pulse timer circuit has its condenser C2 the input capacitor of the second pulse timer discharges through transistor Q2 of the open time timer thus initiating the delay period of the second pulse timer in the same manner as previously described for the open time timer and the first pulse timer. At the beginning of the second pulse timer delay period input capacitors C1 of the second pulse flip-flop is charged and input capacitor C2 of the interval timer is charged. At the time of the delay period of the second pulse timer as determined by the time constant as determined by the discharge of capacitor C1 through R1 and R3 of the second pulse timer this timer returns to its initial condition as previously described with transistor Q2 conducting and transistor Q1 cut off. At this time input capacitor C1 of the second pulse flip-flop discharges through transistor Q2 of the second pulse timer thus changing the state of the second pulse flip-flop and causing transistor Q3 associated with the second pulse flip-flop to cease conduction of current. This brings about the de-energization of the second pulse relay. The front contact 3, contact R2 of the second pulse relay opens thus removing power from the operating coil of the key 1–2 relay which inturn opens its front contacts 3 and 6 and thereby removes the tone 1 and tone 2 frequencies from the transmission line L1–L2 defining the end of the second burst of two tone frequencies on transmission line L1–L2.

At the same time as the second pulse relay is de-energized input capacitor C2 of the interval timer also discharges through transistor Q2 of the second pulse timer thereby initiating the operation of the interval timer, the time again being determined by the discharge of C1 through R1 and R3 in the interval timer. At the beginning of this delay period input capacitor C1 of the interval flip-flop is positively charged. At the end of the interval at which time the interval timer returns to its initial condition with transistor Q2 conducting and transistor Q1 cut off input capacitor C1 of the interval flip-flop discharges through transistor Q2 of the interval timer thus changing the state of the interval flip-flop and causing transistor Q3 associated with the interval flop-flop to cease conduction of current. This brings about the de-energization of the interval relay.

It will be noted that the open time relay, the second pulse relay and the interval relay were all energized at the time when the first pulse timer was triggered thus initiating the delay period which defined the first pulse. During this period the first pulse relay is energized with the open time relay, the first pulse relay and the interval relay. At the end of this period the first pulse relay was de-energized and back contact 1, contact L2 of the first pulse relay closed to apply power to the key A relay from positive supply voltage through the all call switch through the series parallel arrangement of manually operated switches 3T, 2T and 1T front contact 9, back contact L8 of the code determining relay 1–2:1–2 to one side of the operating coil of the key A relay through front contact 3, contact R2 of the interval relay to common return. Upon the energization of the key A relay its front contact 2, 3 closed to key the A tone thus placing the A tone frequency on the transmission line L1–L2. This tone was thus impressed on the transmission line L1–L2 during the delay period of the open time timer and also during the delay period of the second pulse timer and also during the delay period of the interval timer. It was removed from the transmission line upon the de-energization of the interval relay at the end of the delay period of the interval timer. Thus the A tone frequency was first placed on transmission L1–L2 after the end of the first tone burst of two frequencies remained on the transmission line during the second burst of two tone frequencies and also remained on the transmission line after the second burst of two tone frequencies for the period as defined in the interval timer.

Also when the first pulse relay was de-energized its back contact 4, contact R5 closed to re-energize the X relay from positive battery through front contact 6, contact R5 of the open time relay front contact 6, contact L5 of the ST relay front contact 12, contact L11 of the code determining relay 1–2:1–2 to one side of the operating coil of the X relay the other side of which is connected to negative return. Upon energization of the X relay its front contact 3, contact 2 closed to provide a stick circuit through the manually operated switches 1T, 2T and 3T the all call switch to positive source of supply in multiple with its pickup circuit.

Going back to the de-energization of the interval relay at that time the front contact 6, contact R5 of the interval relay opened to open the stick circuit to the ST relay and the stick circuit of the code determining relay 1–2:1–2 thereby de-energizing these two relays.

The re-energization of relay X together with the de-energization of the ST relay and the code determining relay 1–2:1–2 resets the relay portion of the circuit in preparation for the next operation of any of the manually operated function switches.

Also upon the de-energization of ST relay the pickup circuit of the X relay is broken by means of contact L5, front contact 6, of the ST relay being opened.

Also upon the de-energization of the ST relay a circuit is completed from positive supply voltage through back contact 1, contact R2 of the ST relay back contact 1, contact L2 of the interval relay through resistor R7 of the first pulse flip-flop to the base of transistor Q1 in the first pulse flip-flop causing transistor Q1 in this flip-flop to conduct current thereby causing transistor Q2 of this flip-flop to cease conduction of current thereby allowing base current to be supplied from positive source of supply through resistor R2 resistor R9 to the base of transistor Q3 associated with the first pulse flip-flop thereby causing transistor Q3 to conduct current and bring about the energization of the first pulse relay.

Also upon de-energization of the ST relay and the opening of its front contact 3 base current was removed from ST pulse line transistor QS thereby allowing negative bias as supplied through resistor R*b* to cut off transistor QS causing it to cease conduction of current. The collector of QS now rises toward positive voltage and current is supplied from positive supply through resistor R*c* to the ST pulse line thereby re-charging the input capacitor C2 of the first pulse timer, the open time flip-flop, the second pulse flip-flop and the interval flip-flop thereby returning each of these circuits to the initial conditions outlined or as previously described in readiness for the next input signal.

Upon the re-energization of the first pulse relay the pickup circuit of the X relay is opened at a second position by the opening of the back contact 4 from the R5 contact of the first pulse relay.

The front contact 3 of the first pulse relay is closed to the contact R2 for setting this circuit up in readiness to re-energize the code determining relay.

The first pulse relay front contact 6 is closed to the contact R5 in readines to supply positive current to the keying circuit when the same is determined by the energization of the code determining relay for the next impulse. Thus the circuit is in complete readiness for the next or succeeding function which would initiate the complete circuit as previously described.

It will be noted that the key relay 1 is provided with a single front contact 3 for the first tone transmitter to transmit a single frequency on the line L1–L2 in the same manner as the keying relay A to C are set up to perform. The purpose of showing the key relay 1 for this type of operation is to illustrate that a circuit of his character may provide for a combination of a burst of two tones as a first or second burst of a single tone for first or second bursts in the same manner as the keying relay. However, as previously pointed out the use of two tone frequencies for the first and for the second bursts in the control system of this invention greatly enhanced the security as well as the capacity of this coded tone transmission control circuit.

By the same token the transmitter station as illustrated in FIG. 8 being the solid state may be reproduced in the receiver in place of the receiver circuit illustrated in FIG. 2 or the receiver illustrated in FIG. 2 will function from the solid state transmitter as illustrated in FIG. 8. Thus we have shown three distinct transmitters than can operate on the same receiver in FIG. 2 with the same fidelity and security as each other in view of the fact that two tone signals are employed in a single burst in transmitting these signals to perform their separate functions. It is obvious that with the time delay relays, the open time, the second pulse and the interval relay of FIG. 1 and the timer contacts operating the same relay in FIG. 7 and with the proper setting of the solid state open time timer, the second pulse timer and the interval timer of FIG. 8 that the timing chart of FIG. 4 will be completed with the operations of the structures of FIG. 7 and FIG. 8 so that they will be illustrated as in FIG. 1.

I claim:

1. A coded tone supervisory system having a transmitting station with a plurality of tone transmitters, a two wire control line connected to every tone transmitter at the transmitting station and extending to at least one receiving station capable of disseminating the coded tones transmitted, a plurality of keying relays at least one for each tone transmitter to place its selected tone frequency on said control line, a plurality of code determining relays each of which is energized by at least one function the signal for which is to be transmitted as a coded tone pulse over said control line, a start relay and at least one of said keying relays both connected to be energized by said code determining relay, a first pulse relay, an open time relay, a second pulse relay, an interval relay the last three of which are time delay in opening, said first pulse relay energized by a series circuit including back contacts of said start and interval relays, a holding circuit for said first pulse relay through a series connection of its holding front contact and a back contact of said interval relay, said open time relay energized through series connected front contacts of said start and first pulse relays, said second pulse relay energized through series connected front contacts of said start and open time relays, said interval relay energized through series connected front contacts of said start and second pulse relays, said first keying relay actuating selected of said tone transmitters as the first pulse of tone frequency on said control line from the time said start relay is energized till said interval relay is energized to open the holding circuit of said first pulse relay, a second keying relay energized through the series connected back contacts of said first pulse relay and open time relay and a front contact of said second pulse relay, said second keying relay actuating its respective selected tone transmitters as the second pulse of tone frequency on said control line from the time said open time relay drops till said second pulse relay drops, said first and second time spaced control line pulses of tone frequency being separated by the time said open time relay remains up to complete the cycle of the group selection and the function selection of the coded line signal.

2. The coded tone supervisory system of claim 1 wherein the open time period of said open time relay between said first and second time spaced pulses is within the time delay in opening period of said open time relay, the second pulse period is within the time delay in opening period of said second pulse relay, and said interval period is within the time delay in opening period of said interval relay.

3. The coded tone supervisory system of claim 1 including a third keying relay energized through a front contact of said code determining relay and a back contact of said first pulse relay and a front contact of said interval relay, said third keying relay actuating another selective tone transmitter producing a third tone frequency on said control line, said third tone frequency on said control line at least extending through said open time and second time spaced pulse.

4. The coded tone supervisory system of claim 3 wherein selected of said keying relays actuate a plurality of tone transmitters simultaneously to produce a burst of tone frequencies.

5. A coded tone supervisory system having a transmitting station with a plurality of tone transmitters and a receiving station with a frequency matched tone receiver for each tone transmitter, a two wire control line connecting said transmitters and said receivers, a receiver relay actuated by the energization of each tone receiver, a series of repeater relays a specific one of which is energized by circuit combination contacts of at least two of said receiver relay, a series of group relays one of which is actuated by a selected repeater relay in response to a first tone frequency pulse transmitted over said control line, a series of function relays one of which is actuated by a selected of said repeater relays in response to a second tone frequency pulse transmitted over said control line as a second pulse to energize a selected tone receiver and energized through said selected group relay, a tuned function control tone frequency receiver and a receiver relay therefor connected to said control line to receive a function control tone frequency simultaneously with said second pulse, a plurality of final stick relays one for each function, and circuit means to connect said control tone frequency receiver relay through said selected group relay and said selected function relay to energize a selected complete code relay which in turn energizes a selected final stick relay to complete the selected function.

6. The coded tone supervisory system of claim 5 which also includes a de-energizing circuit for each selected final stick relay which is responsive to said selected first and second tone frequency pulses in the absence of said function control tone frequency.

7. A coded tone supervisory system having a transmitting station with a plurality of tone transmitters, a two wire control line connected to every tone transmitter at the transmitting station and extending to at least one receiving station capable of disseminating the coded tones transmitted, said transmitting station including a plurality of keying relays including at least one for each tone transmitter, a plurality of code determining relays each of which is energized by a circuit including a contact of at least one function responsive means the selected function signal for which is to be transmitted as a coded tone pulse over said control line, a progressive circuit closing means connected to cooperate with said code determining relays to actuate selected of said keying relays to produce on said control line a first pulse of tone frequency followed consecutively by an open period and a second pulse of tone frequency followed consecutively by a second interval to complete the cycle of the group selection signal and the function selection signal of the selected function to be transmitted as a coded line signal, said receiving station having a frequency matched tone receiver for each tone transmitter, a receiver relay actuated by the energization of each tone receiver, a series of repeater relays a specific one of which is energized by circuit combination contacts of said receiver relays of a combination of the operation of at least two tone receivers from the excitation, a series of group relays one of which is actuated by a selected repeater relay in response to a first tone frequency pulse transmitted over said control line, a series of function relays one of which is actuated by a selected of said repeater relays in response to a second tone frequency pulse transmitted over said control line as a second pulse to energize a selected tone receiver and energized through said selected group relay, a tuned function control tone frequency receiver and a receiver relay therefor connected to said control line to receive a function control tone frequency simultaneously with said second pulse, a plurality of final stick relays one for each function, and circuit means to connect said control tone frequency receiver relay through said selected group relay and said selected function relay to energize a selected complete code relay which in turn energizes a selected final stick relay to complete the selected function.

References Cited

UNITED STATES PATENTS

| | | | |
|---|---|---|---|
| 2,477,973 | 8/1949 | Evers | 340—171 |
| 2,623,939 | 12/1952 | Derr | 340—163 |
| 2,861,257 | 11/1958 | Weintraub | 340—163 |
| 2,900,621 | 8/1959 | Stenerson et al. | 340—171 XR |
| 3,140,468 | 7/1964 | Blaisdell et al. | 340—171 |

JOHN W. CALDWELL, *Primary Examiner.*

DONALD J. YUSKO, *Assistant Examiner.*

UNITED STATES PATENT OFFICE
CERTIFICATE OF CORRECTION

Patent No. 3,396,370 August 6, 1968

Norman F. Agnew

It is certified that error appears in the above identified patent and that said Letters Patent are hereby corrected as shown below:

Column 17, line 22, "relay" should read -- relays --.

Signed and sealed this 16th day of December 1969.

(SEAL)
Attest:

Edward M. Fletcher, Jr.
Attesting Officer

WILLIAM E. SCHUYLER, JR.
Commissioner of Patents